(12) United States Patent
Moore (10) Patent No.: US 10,737,779 B2
(45) Date of Patent: Aug. 11, 2020

(54) VEHICLE CONTROL SYSTEM FOR TRANSITIONING BETWEEN MEDIUMS

(71) Applicant: The Johns Hopkins University, Baltimore, MD (US)

(72) Inventor: Joseph L. Moore, Sykesville, MD (US)

(73) Assignee: The Johns Hopkins University, Baltimore, MD (US)

( * ) Notice: Subject to any disclaimer, the term of this patent is extended or adjusted under 35 U.S.C. 154(b) by 182 days.

(21) Appl. No.: 16/059,397

(22) Filed: Aug. 9, 2018

(65) Prior Publication Data

US 2019/0055013 A1 Feb. 21, 2019

Related U.S. Application Data

(60) Provisional application No. 62/547,139, filed on Aug. 18, 2017.

(51) Int. Cl.
*B64C 37/00* (2006.01)
*B63G 8/08* (2006.01)
*B64C 39/02* (2006.01)
*B63G 8/00* (2006.01)

(52) U.S. Cl.
CPC ............ *B64C 37/00* (2013.01); *B63G 8/001* (2013.01); *B63G 8/08* (2013.01); *B64C 39/024* (2013.01); *B63G 2008/002* (2013.01); *B64C 2201/028* (2013.01)

(58) Field of Classification Search
USPC ............................................. 701/3
See application file for complete search history.

(56) References Cited

U.S. PATENT DOCUMENTS

| | | | | |
|---|---|---|---|---|
| 2015/0266576 A1* | 9/2015 | Hobbart | ............ | B60F 5/006 244/2 |
| 2016/0167780 A1* | 6/2016 | Giovenga | ............ | B64C 3/385 244/7 R |
| 2017/0300051 A1* | 10/2017 | Zhou | ............ | G01S 19/14 |
| 2018/0281537 A1* | 10/2018 | Leppo | ............ | B60F 5/02 |
| 2019/0055013 A1* | 2/2019 | Moore | ............ | B63G 8/08 |
| 2020/0062386 A1* | 2/2020 | Zhang | ............ | B64C 35/002 |

* cited by examiner

*Primary Examiner* — Tyler D Paige
(74) *Attorney, Agent, or Firm* — Sung T. Kim (57) ABSTRACT

A vehicle for aerial-aquatic locomotion is provided. The vehicle may include a propeller, an electric motor operably coupled to the propeller and configured to rotate the propeller, a maneuvering assembly configured to change an attitude and altitude of the vehicle, and a controller operably coupled to the electric motor and the maneuvering assembly. The controller may be configured to receive a command for the vehicle to exit a first medium and enter a second medium, compute or retrieve a hybrid trajectory, and control the electric motor and the maneuvering assembly to maneuver the vehicle in accordance with the hybrid trajectory.

20 Claims, 7 Drawing Sheets

VEHICLE CONTROL SYSTEM FOR TRANSITIONING BETWEEN MEDIUMS

CROSS-REFERENCE TO RELATED APPLICATIONS

This application claims priority under 35 U.S.C. § 119(e) to U.S. Provisional Patent Application Ser. No. 62/547,139, filed on Aug. 18, 2017, which is expressly incorporated by reference herein in its entirety.

TECHNICAL FIELD

Example embodiments generally relate to vehicle guidance systems and, in particular, relate to control systems for guiding a vehicle transitioning between mediums, such as water to air.

BACKGROUND

Remote control and autonomous vehicles have become quite popular recently both for recreational, commercial, and military purposes. For example, remote control or autonomous aerial vehicles, also known as drones, are being commonly used by both hobbyists to record a landscape or event from the perspective of the flying drone and by military personnel to perform reconnaissance or deliver munitions. Some commercial entities are currently considering using drones to deliver purchased products to homes or even deliver individuals to a nearby destination.

Despite the popularity of drones and their increasing number of applications, drones still generally suffer from the limitation that they are often unable to operate in water or, rather, in a fluid medium in addition to operating in air. Being able to transition between submerged water activities and aerial activities has generally not been possible for remote control or autonomous vehicles and, therefore, applications that would be available to a vehicle that can perform such transitions have not be realized.

BRIEF SUMMARY OF SOME EXAMPLES

According to some example embodiments, a vehicle for aerial-aquatic locomotion is provided. The vehicle may comprise a propeller, an electric motor operably coupled to the propeller and configured to rotate the propeller, a maneuvering assembly configured to change an attitude and altitude of the vehicle, and a controller operably coupled to the electric motor and the maneuvering assembly. The controller may be configured to receive a command for the vehicle to exit a first medium and enter a second medium, compute or retrieve a hybrid trajectory for transitioning the vehicle from the first medium to the second medium, control the electric motor and the maneuvering assembly to maneuver the vehicle in accordance with the hybrid trajectory, and track a state of the vehicle. Based on the state indicating that the vehicle is in a medium transitional mode, the controller may be configured to make maneuvering adjustments to maintain compliance with the hybrid trajectory, or based on the state indicating that the vehicle has completed entry into the second medium and the vehicle is in a non-transitional mode, the controller may be configured to make maneuvering adjustments for operation in the second medium. In this regard, the state of the vehicle may include one or more of a mode, an altitude, an attitude, and a speed of the vehicle.

Additionally, an example method for controlling the movement of an aerial-aquatic vehicle is provided. The example method may comprise receiving a command, at a controller, for the vehicle to exit a first medium and enter a second medium, computing or retrieving a hybrid trajectory for transitioning the vehicle from the first medium to the second medium, and controlling an electric motor and a maneuvering assembly of the vehicle to maneuver the vehicle in accordance with the hybrid trajectory. The example method may further comprise tracking a state of the vehicle. Based on the state indicating that the vehicle is in a medium transitional mode, the method may include making maneuvering adjustments to maintain compliance with the hybrid trajectory, or, based on the state indicating that the vehicle has completed entry into the second medium and the vehicle is in a non-transitional mode, the example method may include making maneuvering adjustments for operation in the second medium. The state of the vehicle may include one or more of a mode, the altitude, the attitude, and the speed of the vehicle.

Additionally, a control system for a vehicle capable of travelling through medium transitions is provided. The control system may comprise a controller and a plurality of sensors providing inputs to the controller. The controller may configured to receive a command for the vehicle to exit a first medium and enter a second medium, compute or retrieve a hybrid trajectory transitioning the vehicle from the first medium to the second medium, and control the electric motor and a maneuvering assembly operably coupled to the controller to maneuver the vehicle in accordance with the hybrid trajectory. The controller may be further configured to track a state of the vehicle. The state of the vehicle may include one or more of a mode, an altitude, an attitude, and a speed of the vehicle.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, an aerial-aquatic vehicle is provided that can seamlessly transition between water-submerged motion and in-air flight (and vice versa) through trajectory and speed control of a propeller and a vehicle maneuvering assembly (e.g., control surfaces such as flaps). Vehicles that attempt to make such transitions between water and air often suffer from stalling during a transition into the air from the water, or an inability to exit the water directly to take flight due to, for examples, issues associated with drag on the vehicle to achieve lift when leaving the water. Also, when entering the water from the air, a vehicle can be subjected to relatively large hydrodynamic forces during entry into the water resulting in a significant loss of velocity. As such, a technical problem exists regarding how a vehicle capable of submerged motion and also air flight can make a continuous motion transition between those media (e.g., from water to air or air to water). According to some example embodiments, a technical solution to this problem can involve detecting the speed and position of the vehicle (e.g., the altitude and attitude of the vehicle) relative to the interface between the mediums (e.g., surface of the water) prior to breaching the interface, and then determining an associated approach trajectory and speed for the vehicle that can be used to breach the interface between the mediums and maintain vehicle movement. Due to variations in the environment, a closed-loop feedback control system may be used to repeatedly adjust the trajectory and speed of the vehicle to complete the transition. With such an approach, according to some example embodiments, an amphibious vehicle (e.g., drone) may be realized that can operate equally effectively in both the air and under water, and seamlessly transition between the two mediums.

As mentioned above, to perform the medium transition, such a vehicle, according to some example embodiments, may employ a specially configured control system. The control system may monitor a variety of on-vehicle sensors and use the sensor-provided information as inputs for maneuvering or controlling the movements of the vehicle using a closed-loop feedback. According to some example embodiments, a water-to-air autonomous transition, for example, may be performed by the control system using a strategy based on a hybrid state estimator that monitors the sensors to determine a state of the vehicle and a closed-loop feedback policy capable of following vehicle trajectory through the water, air, and medium transitional modes or domains. In this regard, the state estimator may be considered a hybrid state estimator due to the reliance on multiple different measurement models depending on the domain or mode of the vehicle. As such, the hybrid state estimator may operate differently, based on a different model of operation, depending on which mode or domain is associated with the current operation. A control system may implement the state estimator that indicates the control behavior that can be employed while the vehicle is in a given mode. According to some example embodiments, the modes that may be experienced by the vehicle as part of the state estimate are (1) submerged, (2) transitioning from submerged to air, (3) air, and (4) transitioning from air to submerged.

Additionally, the state estimator can be implemented in conjunction with model predictive control, or more specifically, a linear model predictive control, implemented by the controller of the vehicle to monitor and control the operation of the vehicle. In this regard, state constraints may be incorporated into the approach involving the linear model predictive control where a feedback controller is designed with constraints that prevent scenarios where the vehicle would otherwise be pushed back into a medium immediately after the vehicle's transition from the medium is complete. For example, in an instance in which, during a water exit, an overshoot in the feedback controller would cause the vehicle to immediately reenter the water, the linear model predictive control with constraints may operate to prevent the vehicle from reentering the water, thereby avoiding a failure by the vehicle to exit the water.

One of many advantages of such an autonomous vehicle capable of transitioning between air and water operation is the ability to dive under the water to acquire measurements, take samples, or the like at specific, possibly remote, locations and then exit the water into air flight to return the measurements or samples to an origin. Additionally, if data is being returned, the vehicle may exit the water to begin a communication session with, for example, a tower or satellite to transmit the data that was acquired during submersion. Such a vehicle may be particularly useful with respect to landlocked bodies of water that may be reached via in air flight and then measurements may be taken by submerging the vehicle.

Figure 1:
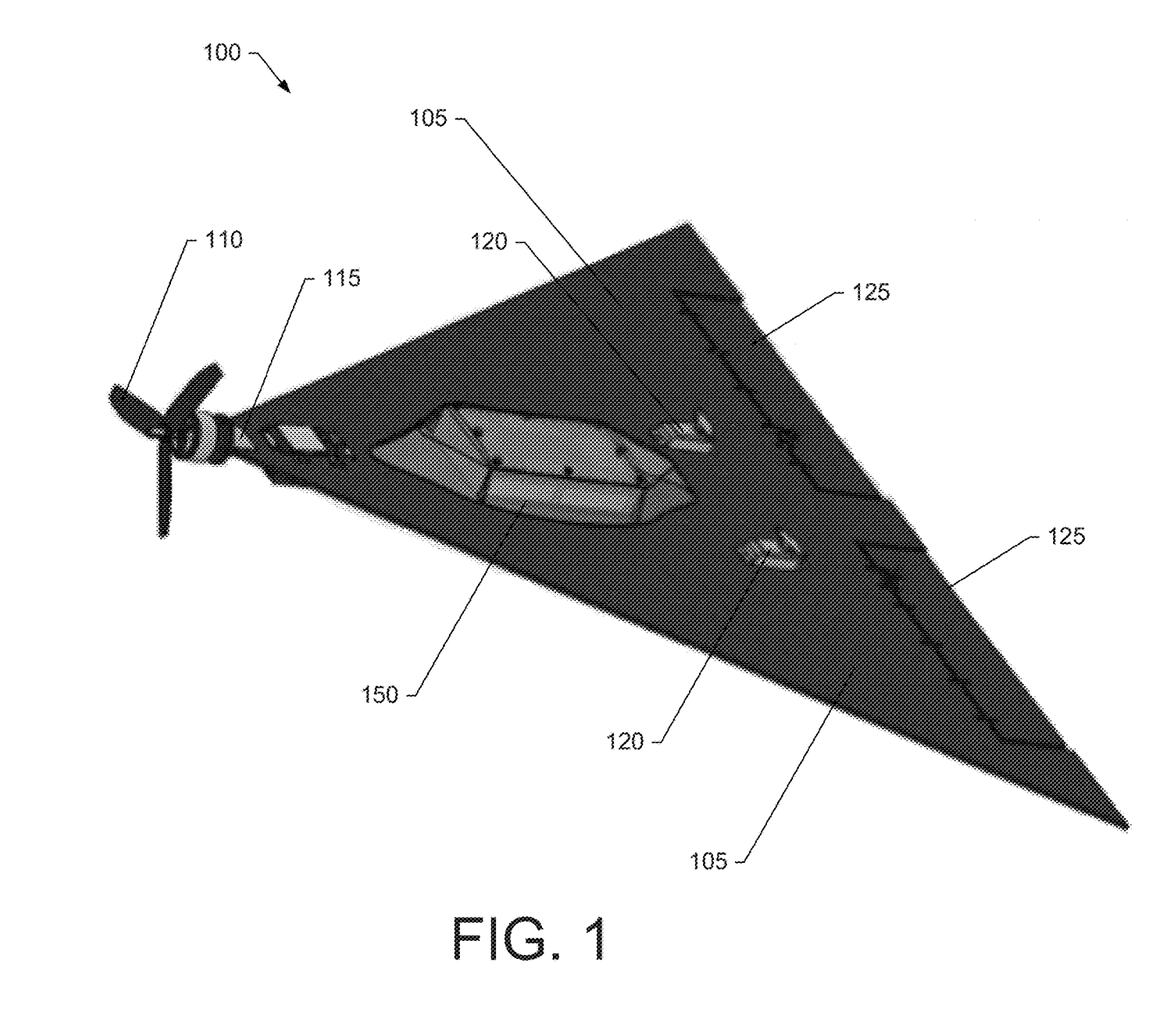
FIG. 1 illustrates an example vehicle for transitioning between water and air media according to some example embodiments.

Various types and body architectures may be employed to develop such a vehicle, with one type shown in FIG. 1. The vehicle 100 is designed and configured to operate as a unmanned aerial aquatic vehicle (UAAV). According to some example embodiments, the vehicle 100 may include wings 105, such as fixed wings that may be disposed in a delta wing arrangement. However, according to some example embodiments, a folded wing design may alternatively be employed.

The vehicle 100 may include a propeller 110 that is driven by a motor 115. The propeller 110 may be configured to provide propulsion for the vehicle 100 in both submerged and flight environments. According to some example embodiments, the propeller 110 may be the only component that provides thrust to propel the vehicle 100. The blades of the propeller 110 may be designed for both submerged and flight operation and may be relatively light weight. The propeller 110 may be disposed at a forward end of the vehicle 100. By positioning the propeller 110 at the forward end of the vehicle 100, medium transitions (e.g., air-to-water or water-to-air) may be detectable as soon as the vehicle 100 begins to enter into a different medium due to detectable changes in the speed of the propeller 110 and the motor 115 during interaction with the different medium. In some example embodiments, a second propeller may be included that is designed for submerged operation to assist with locomotion underwater.

According to some example embodiments, the motor 115 may be an electric motor with speed control capabilities. In this regard, the motor 115 may include a motor controller or a separate controller (e.g., control circuitry 150) may be used to directly control the operation of the motor 115. According to some example embodiments, the motor 115 may be a brushless electric motor and therefore may not require waterproofing measures. The motor 115 may be controllable to speeds that can vary to allow for transitions from x rotations per minute (RPM) to 15×RPM. Supporting such a controllable variation in speeds for the motor 115 (and thus propeller 110) can assist the vehicle 100 in its ability to transition between water and air because high propeller RPM may be needed for air flight, while low propeller RPM may be used for submerged movement while maintaining the speed of the vehicle 100. Additionally, during a transition from the water to air, the motor 115 may need to increase the rotational speed (RPM) very rapidly (e.g., from x to 15×) to escape the water. According to some example embodiments, the vehicle 100 may be designed such that the propeller 110 and motor 115 can generate a thrust-to-weight ratio of greater than one, which permits the propeller 110 and motor 115 to generate additional thrust (exceeding the weight of the vehicle 100) to pull the vehicle 100 from the water and into the air.

The vehicle 100 may also include a maneuvering assembly that may comprise various control surfaces or flaps that are controllable to pivot and cause aerodynamic changes for the vehicle 100. According to some example embodiments, the control surfaces and the mechanisms that facilitate movement of the control surface may collectively be referred to as the maneuvering assembly. In this regard, movement of the control surfaces may cause changes to pitch, yaw, and roll while the vehicle 100 is in motion, which can cause changes to the vehicle 100's attitude and altitude. The vehicle 100 may include control surfaces in the form of flaps on, for example, the rear portions of the wings 105, on a tail (not shown) of the vehicle 100, or the like. In FIG. 1, the vehicle 100 is shown with two flaps or elevons 125 that may be independently controlled via respective actuators (e.g., servos) 120.

The vehicle 100 may also include control circuitry 150 that is operably coupled to the motor 115 and the maneuvering assembly in the form of actuators 120 to control the elevons 125 (or other control surfaces). The control circuitry 150 may be protected within a waterproof pod comprised of, for example, nylon or other thermoplastic. Additionally, the pod may be vacuum sealed. The control circuitry 150 may include a controller that may take the form of a software/firmware and/or hardware configurable integrated circuit configured to perform the operations described herein to control the vehicle 100. In this regard, the controller may include or be operably coupled to a memory device to store data and instructions. As such, the controller may be configured to send control signals to the motor 115 and the actuators 120 of the maneuvering assembly to control the maneuvering operation thereof. Further, the controller may also receive status or feedback signals from the motor 115 and the actuators 120.

The control circuitry 150 may also include or be operably coupled to various sensors, such as vehicle condition sensors, which may include the motor current sensor described below. An example sensor is a current sensor for monitoring the amount of electrical current being drawn by the motor 115. For example, the controller may be configured to receive a signal from a sensor on the motor 115 where the signal is indicative of the electric current being provided to the motor 115. In this regard, the electric current being provided to the motor 115 may be used as an indicator or a proxy for the rotational speed of the motor 115. Another sensor that may be included on the vehicle 100 is a range finder (e.g., an ultrasonic range finder) that may be configured to determine a distance to a medium interface (e.g., the distance to the water line either from a submerged position or an in-flight position). Further, the control circuitry 150 may include a pressure sensor configured to measure the barometric pressure of the environment of the vehicle 100. Another sensor may be a three-axis accelerometer configured to determine an orientation of the vehicle 100. Another sensor may be a microelectromechanical systems (MEMS) gyroscope configured to determine a rate of rotation of the vehicle 100. Yet another sensor may be a pitot-tube configured to measure a fluid flow velocity when, for example, the vehicle 100 is submerged. Additionally, a global positioning system (GPS) sensor for determining a geographic position of the vehicle 100 may be included. Another sensor that may be included is a lateral line sensor that may be used to determine the submersion depth of the fuselage or body of the vehicle during a medium transition. In this regards, a metal trace disposed along a length of the body of the vehicle from the forward to rear of the vehicle could be monitored and measured for a resistance value. Changes in the resistance would be indicative of the physical portion of the fuselage of the vehicle that is within, for example, the water.

Figure 2:
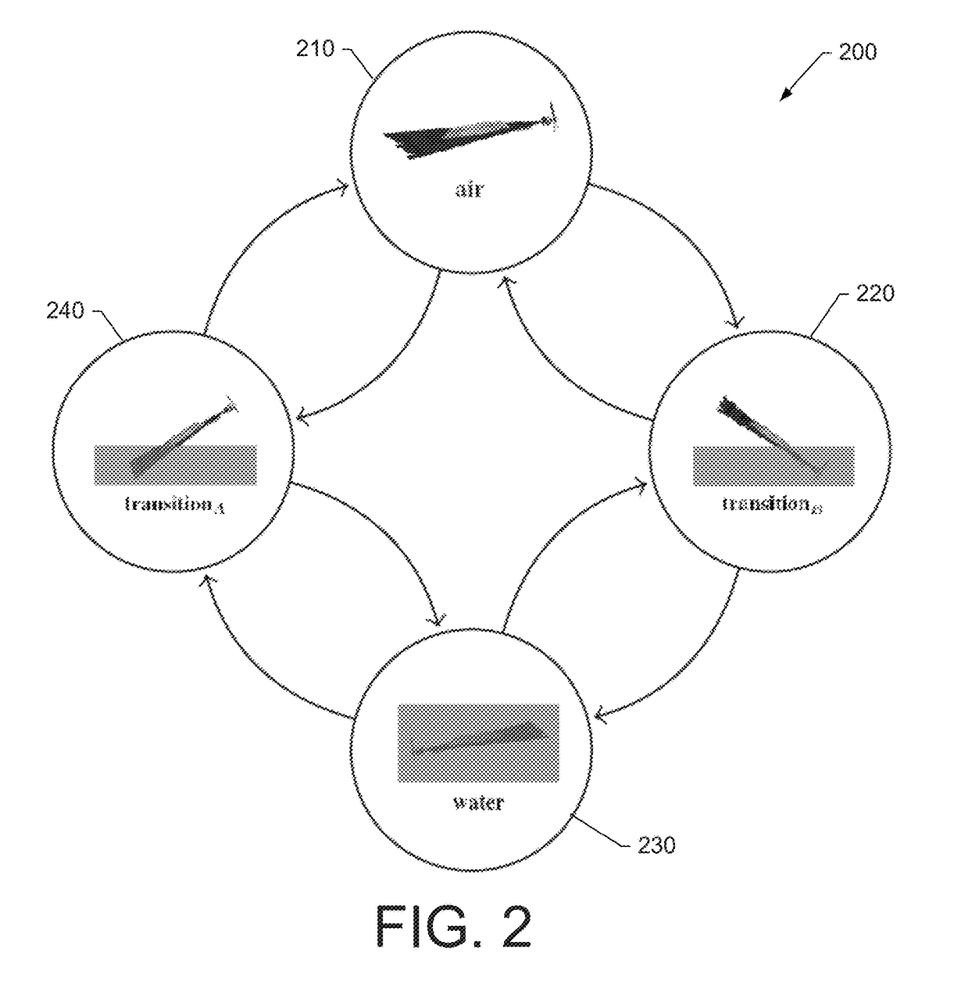
FIG. 2 illustrates an example mode schedule indicating the environmental modes of the vehicle according to some example embodiments.

Now with respect to FIG. 2, and as mentioned above, a mode schedule 200 can be defined based on four different modes for the vehicle 100 in a hybrid system. In this regard, the modes may be defined in accordance with the medium-based environment conditions that the vehicle 100 may be subjected to. As such, the four modes of the schedule 200 may include an air mode 210, an air-to-water transition mode 220, a water mode 230, and a water-to-air transition mode 240. In this regard, the vehicle 100 may move through the modes beginning, for example, in the air mode 210 to the air-to-water transition mode 220, then to the water mode 230, then to the water-to-air transition mode 240, and then back to the air mode 210. According to some example embodiments, with respect to the internal arrows of the schedule 200, a return to a previous mode may also be included in the hybrid system in the form of bidirectional edges to the schedule 200. For example, moving through the schedule 200 could also involve moving, for example, from the water-to-air transition mode 240 (e.g., propeller first) to air mode 210, or a move back from the air mode 210 to the water-to-air mode 240 (tail first) may occur. There may be two categories of modes—medium transitional modes and non-transitional modes. Medium transitional modes may include the modes where the vehicle 100 is transitioning from one medium to another (e.g., water to air, or air to water). In this regard, the non-transitional modes may include the modes where the vehicle 100 remains in a single medium (e.g., air or water).

According to some example embodiments, a current mode of the vehicle 100 may be determined, wholly or in part, based on a period of the sensed electric voltage to the motor 115 or, according to some example embodiments, a period of the sensed electric current. In this regard, the current to the motor windings changes substantially as the propeller 110 transitions, for example, from water to air. Thus, the period of the electric voltage may be greatly reduced and RPM of the motor 115 may be greatly increased as the propeller 110 breaches the surface of the water and reaches air. This change in the period of the voltage may be detected as exceeding a threshold change value, which would be indicative of a vehicle 100 transitioning, for example, from the water to the air. Similarly, the period of the electric voltage may be greatly increased as the vehicle 100 transitions from air to water, and thus penetrating into another medium through a medium interface may be detectable as well by monitoring for a change in the period of the electric voltage to the motor 115 that exceeds a threshold change value.

Figure 3:
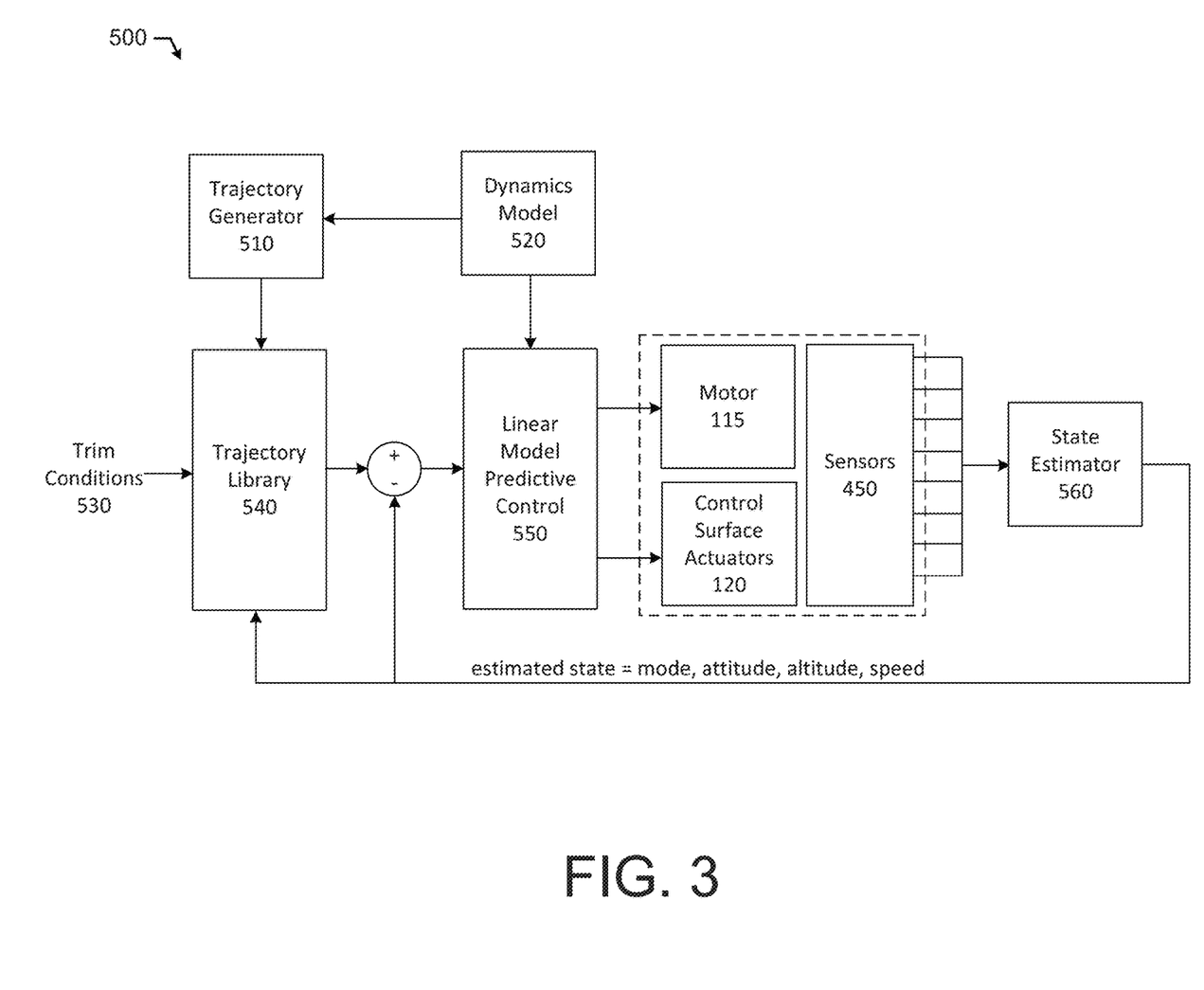
FIG. 3 illustrates an example closed-loop control process diagram according to some example embodiments.

FIG. 3 provides a closed-loop control process diagram, which may be implemented by the control circuitry 150 in accordance with some example embodiments. In this regard, initially, a trajectory library 540 may be populated based on various trim conditions 530 that may be experienced by the vehicle 100. Additionally, the trajectory library 540 may be populated based on generated trajectories provided by the trajectory generator 510, which are generated in consideration of a dynamics model 520. The dynamics model 520 may be based, at least in part, on the architecture and design of the vehicle 100. In operation, the trajectory generator 510 may be configured to generate launch and dive trajectories across discontinuous media (e.g., water-to-air, or the like). According to some example embodiments, the trajectory generator 510 may be implemented by a controller on board the vehicle 100 to permit the computation of a trajectory in real-time or in near-real-time based on environmental information received from the sensors in addition to the dynamics model 520 of the vehicle 100.

Based on a state of the vehicle 100, as defined by the mode, attitude, altitude, and speed of the vehicle, a hybrid trajectory may be determined either through computation or retrieved from the trajectory library 540 and provided, with the state information, to a linear model predictive control 550. Relying upon the closed-loop feedback of the state, the linear model predictive control 550 may operate to stabilize the controls needed to maneuver the vehicle 100 to maintain compliance with the hybrid trajectory and the speed control of the motor 115. The linear model predictive control 550 may include an implemented method of process control that operates to compensate for and maintain satisfaction of a set of constraints (e.g., attributes of the selected trajectory and motor speed) despite changes in various inputs. As such, the linear model predictive control 550 may generate control signals that may be delivered to the motor 115 and the control surface actuators 120 to implement the trajectory. With the sensors 450 regularly or repeatedly providing updated information, a state estimator 560 may be utilized to integrate the sensor measurements to formulate a state estimation comprising a mode, attitude, altitude, and speed. The state estimation may then be provided as closed-loop feedback to the linear model predictive control 550.

Figure 4:
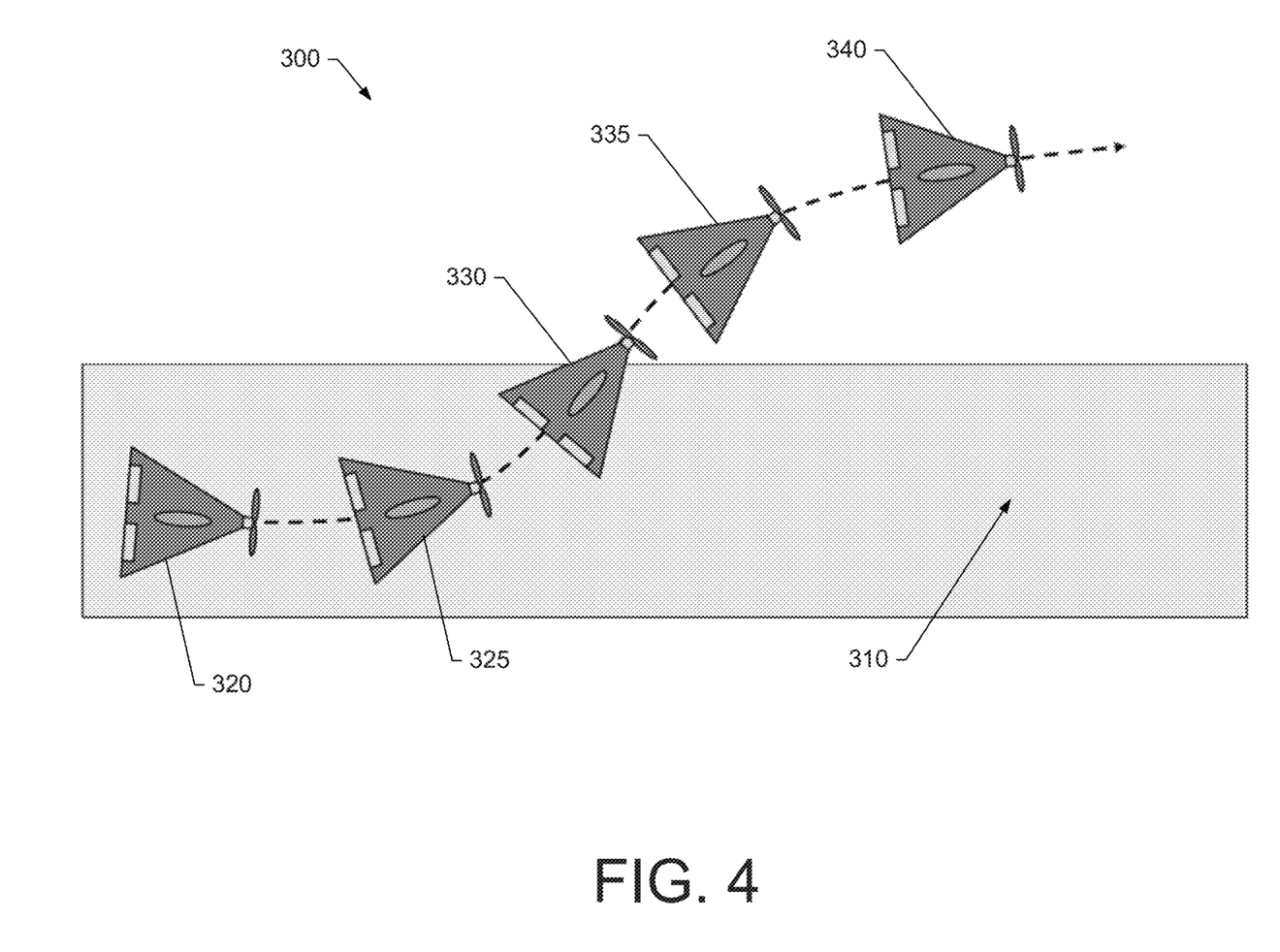
FIG. 4 illustrates a water-to-air transition according to some example embodiments.
Figure 5:
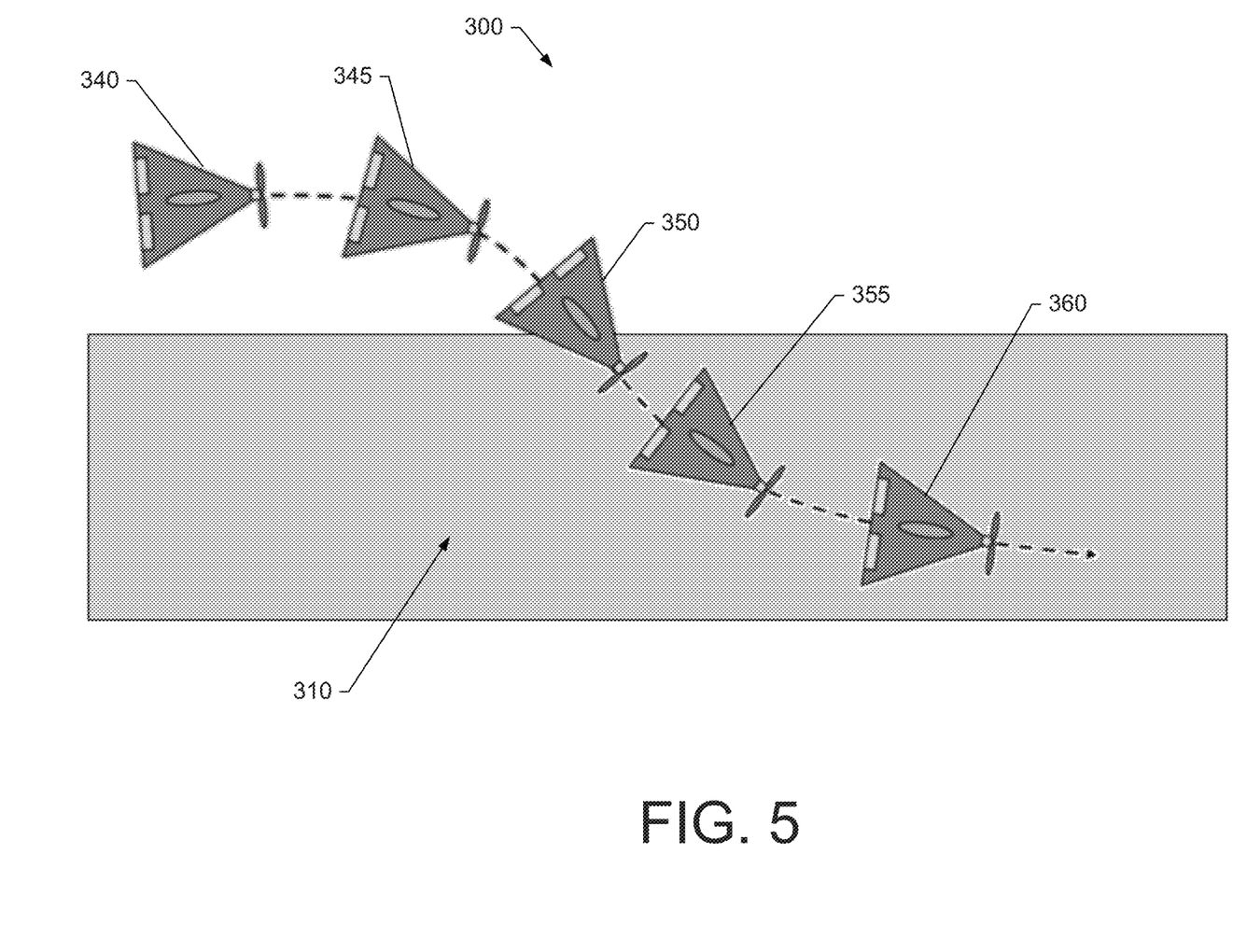
FIG. 5 illustrates an air-to-water transition according to some example embodiments.

With the example closed-loop control approach discussed above as a backdrop, a water-to-air transition is described hereinafter in association with FIG. 4, and an air-to-water transition is described with respect to FIG. 5. As seen in FIG. 4, the vehicle 100 may move through a series of positions or phases as the vehicle 100 transitions from submerged motion in the water 310 to flight in the air 300. Such a water-to-air transition may be conducted in accordance with a sequence of maneuvering and motor controls to implement the hybrid trajectory for a water-to-air transition. Similarly, as seen in FIG. 5, the vehicle 100 may move through a series of positions or phases as the vehicle 100 transitions from flight in the air 300 to submerged motion in the water 310. Such an air-to-water transition may be conducted in accordance with a sequence of maneuvering and motor controls to implement the hybrid trajectory for an air-to-water transition.

In this regard, referring to FIG. 4 at 320, the vehicle 100 is in a submerged swim cruise phase until a decision is made to transition to air flight. When the decision to transition is made, for example, due to receipt of an associated command, the control system may cause the vehicle 100 to adjust the vehicle 100's position at 325 relative to the medium threshold (i.e., water line) during a rise phase and in accordance with a determined hybrid trajectory based on the estimated state of the vehicle 100. Additionally, the motor 115 may be controlled to increase the speed to build momentum for the surface breach. The control system may also track the state of the vehicle 100 and make associated adjustments to maintain compliance with the hybrid trajectory. In this regard, for example, the barometric pressure provided by an on-vehicle pressure sensor may be leveraged to determine the depth or altitude of the vehicle 100 underwater to assist in adjusting the movements of the vehicle to maintain compliance with the determined hybrid trajectory.

At 330, during a sense and exit phase, the vehicle 100 may begin to breach the surface of the water and the vehicle 100 is in a detectable transition from the water to the air due to the propeller 110 being above the water surface and in the air. As the forward end of the vehicle 100 breaches the surface of the water, the sudden change in the medium density (i.e., from water to air) can cause the RPM of the propeller 110 to suddenly increase. This change in RPM may be detectable via a change in the current to the motor 115, thereby detecting a change in the mode of the vehicle 100. At 335, according to some example embodiments, in response to the detected change into the medium transition mode from water to air, the control system may cause the motor 115 to further increase the speed in an effort to ensure that vehicle 100 is pulled from the water during a prop-hang phase. According to some example embodiments, the hybrid trajectory and motor speed used to exit the water may include positioning the vehicle 100 to conduct an angled prop-hang (e.g., 45 degree prop-hang) to exit the water. Upon completion of the prop-hang phase and complete exit of the vehicle 100 from the water, the state of the vehicle 100 may again be determined or estimated and the controls may be provided to allow the vehicle 100 to enter an air flight cruise phase at 340.

Now referring to FIG. 5, a transition from air to water is described for the vehicle 100 in association with the closed-loop control approach described above. In this regard, the process begins with the vehicle 100 in the air flight cruise phase, again, at 340. At a point when a decision is made, for example, due to receipt of an associated command to perform an air-to-water entry, a hybrid trajectory and speed may be determined, possibly via computation or retrieval from the trajectory library 540, based on the estimated state of the vehicle 100. As such, at 345, a dive phase may be implemented where a hybrid trajectory and speed toward the water surface are determined and implemented. In this regard, according to some example embodiments, an ultrasonic measurement from a range finder may be used to determine the altitude in the form of a distance to the surface of the water during the dive phase. Further, according to some example embodiments, the vehicle 100 may perform an airborne stall to reduce the entry speed of the vehicle 100 into the water.

At 350, during a sense and entry phase, the vehicle 100 has begun to breach the surface of the water and the vehicle 100 is in a detectable transition from the air to the water. As the forward end of the vehicle 100 breaches the surface of the water, the sudden change in the medium density (i.e., from air to water) can cause the RPM of the propeller 110 to suddenly decrease. This change in RPM may be detectable via a change in the electric current to the motor 115, thereby detecting a change in the mode of the vehicle 100. At 355, according to some example embodiments, in response to the detected change into the medium transition mode from air to water, the control system may cause the motor 115 to further decrease the speed in an effort to slow the vehicle 100 during entry into the water during a submerged dive phase. The state of the vehicle may again be determined or estimated, as part of a tracking scheme, and the controls may be provided during a submerged cruise phase at 360 to allow the vehicle 100 to move under the water.

The control system that may be implemented to perform the above operations may be constructed with respect to a model of the vehicle 100 that is used to compute the hybrid trajectories for medium-to-medium transitions. The vehicle model may serve as the basis for the control design approach, thereby enabling a nominal trajectory design as well as computation of the feedback gains. In this context of the vehicle model, the state may be defined as:

$$x = \{r_x, r_y, r_z, \phi, \theta, \psi, \delta_1, \delta_2, v_x, v_y, v_z, \omega_x, \omega_y, \omega_z\},$$

where $r = [r_x, r_y, r_z]^T$ represents the position of the center of mass of the vehicle in the world frame, $O_{x,y,z}$, $\theta = [\phi, \theta, \psi]^T$, represents the set of z-y-x Euler angles, $\delta = [\delta_1, \delta_2]^T$ are control surface deflections due to the right and left elevons of the vehicle, $v = [v_x, v_y, v_z]^T$ is the velocity of the center of mass in the body fixed frame $O_{xyz}$, $\omega = [\omega_x, \omega_y, \omega_z]^T$ represents the angular velocity of the body-fixed frame. As such, the state can be written as $x = \{r^T, \theta^T, \delta^T, v^1, \omega^T\}^T$. The control input may be $u = [u_{cs}^T, \delta_t]^T$, where $u_{cs}^T$ contains the control surface velocities $[\dot{\delta}_1, \dot{\delta}_2]$ and $\delta_t$ is the thrust of the propeller. The equations of motions may therefore become:

$$\dot{r} = R_b^r v$$

$$\dot{\theta} = R_\omega^T \omega$$

$$\dot{\delta} = u_{cs}$$

$$\dot{\chi} = (M + M_a)^{-1}(f - S(\omega)(M + M_a)\chi - S(v)M_a\chi)$$

where $$\chi = [v, \omega]^T, M = \begin{bmatrix} mI & 0 \\ 0 & J \end{bmatrix}, f = [f.m]^T$$

$$S(\omega) = \begin{bmatrix} S(\omega) & 0 \\ 0 & S(\omega) \end{bmatrix}, S(v) = \begin{bmatrix} 0 & 0 \\ S(v) & 0 \end{bmatrix}.$$

$M_a$ is the added mass matrix, m is the vehicle mass, J is the vehicle's inertia tensor with respect to the center of mass, f is the total force (excluding the forces due to the added mass) applied to the vehicle in body-fixed coordinates, m are the moments applied about the vehicle's center of mass in body-fixed coordinates, $S(\omega) = \omega_x$ and $S(v) = v_x$. $R_b^r$ denotes the rotation for the body-fixed frame to the world frame, and $R_\omega$ is the rotation which maps the Euler angle rates to an angular velocity in the body fixed-frame. The forces f and moments m are dependent on the density of the fluid surrounding the control and lifting forces, which allows for modeling the vehicle 100 as a hybrid system.

In this regard, the hybrid system may be modeled compactly as:

$$\dot{x} = f(x, u, q)$$

$$q = \Phi(x^-, q^-)$$

$$x^+ = \Delta(x^-, q^-)$$

Where q is the mode of the system, $q^-$ is the mode just prior to the transition, $q^+$ is the mode prior to a transition, and $x^+$ represents the state after a mode transition occurs. $\rho_A$, $\rho_F$, and $\rho_{\delta_j}$ represent the density of the fluid surrounding the fore, aft, and control surfaces, respectively. These can be defined using the hybrid mode q as:

$$\rho^T = \begin{bmatrix} \rho_a \\ \rho_F \\ \rho_\delta \end{bmatrix}^T = \begin{cases} [\rho_a \ \rho_a \ \rho_a] & q = q_0 \\ [\rho_w \ \rho_a \ \rho_a] & q = q_1 \\ [\rho_w \ \rho_w \ \rho_w] & q = q_2 \\ [\rho_a \ \rho_w \ \rho_w] & q = q_3 \end{cases}$$

where $\rho_w = 1000 \frac{kg}{m^3}$ and $\rho_a = 1.22 \frac{kg}{m^3}$.

$$q = \Phi(x^-, q^-) = \begin{cases} q_0 & q_1, \Psi_1 < 0 \\ q_0 & q_3, \Psi_2 > 0 \\ q_1 & q_0, \Psi_1 > 0 \\ q_1 & q_2, \Psi_2 < 0 \\ q_2 & q_1, \Psi_2 > 0 \\ q_2 & q_3, \Psi_1 > 0 \\ q_3 & q_2, \Psi_1 < 0 \\ q_3 & q_0, \Psi_2 > 0 \end{cases}$$

and $$\Psi_1(x) = e_{z_r}^T (r + R(Le_x - l_{cg}e_x))$$

$$\Psi_2(x) = e_{z_r}^T (r + Rr_h + RR_\delta(-l_\delta e_{x_\delta}))$$

where $e_{z_r}$ is the unit vector in the $z_r$ direction, $e_x$ is the unit vector in the x direction, L is the length of the wing, $l_{cg}$ is the distance from the trailing edge to the center of mass, $r_h$ is the displacement from the center of mass to the elevon hinge, $R_\delta$ is the rotation matrix for the control surface frame to the body frame, $l_\delta$ is the length from the elevon hinge to the elevon center of pressure, and $e_{x_\delta}$ is the unit vector aligned with the x-coordinate of the elevon. The reset map may simply be given as $x^+ = x^-$.

Having described the vehicle model, a description of the trajectory optimization approach can now be provided. In this regard, according to some example embodiments, a feedback and feedforward control approach can be used.

To reduce a number of parameters in the hybrid trajectory optimization problem, a planarized model which, according to some example embodiments, only considers the vehicle's longitudinal dynamics may be used. To design the trajectory, a direct formulation known as direct transcription can be used, thereby permitting hard constraints to be imposed on the state. Accordingly, a hybrid trajectory optimizer with a hybrid dynamical system, an initial condition set, a final condition set, and a mode schedule may be utilized. The trajectory optimizer may then be able to produce a feasible multi-domain trajectory. In this regard, the trajectory optimization problem can be formulated assuming a mode schedule as described above.

In this regard, let n represent a discrete set of "sub" time horizons where $N_j = \sum_{i=1}^J n_i$, $M_j = N_j - n_j + 1$, $N = N_O + 1$. The cost-function may then be written as:

$$\min_{x_k, u_k, h_j} g_f(x_N) + \sum_{j=1}^{O} \sum_{k=M_j}^{N_j} g(x_k, u_k, h_j)$$

s.t. $\forall k \in \{M_j, ... N_j\}$ and $\forall j \in \{1, ... O\}$ $$x_k - x_{k+1} + \frac{h_j}{6.0}(\dot{x}_k + 4\dot{x}_{c,k} + \dot{x}_{k+1}) = 0$$

$$\Phi_{1,q_j}(x_k) \geq 0, \Phi_{2,q_j}(x_k) \geq 0$$

$$\Phi_{e_j, q_j}(x_{N_j}) = 0$$

$$x_f - \delta_f \leq x_N \leq x_f + \delta_f$$

$$x_i - \delta_i \leq x_N \leq x_i + \delta_i$$

$$x_{min} \leq x_k \leq x_{max}, u_{min} \leq u_k \leq u_{max}$$

-continued $h_{min} \leq h_j \leq h_{max}$ where $\dot{x}_k = f(t, x_k, u_k, q_j), \dot{x}_{k+1} = f(t, x_{k+1}, u_{k+1}, q_j)$ $u_{c,k} = (u_k + u_{k+1})/2$ $x_{c,k} = (x_k + x_{k+1})/2 + h_j(\dot{x}_k - \dot{x}_{k+1})/8$ $\dot{x}_{c,k} = f(t, x_{c,k}, u_{c,k}, q_j)$ The cost function can then be simplified as:

$$\sum_{j=1}^{O} \sum_{k=M_j}^{N_j} u_k^T R u_k h_j + D h_j.$$

This formulation of the optimization problem can allow for trajectory segments to be separated into different modes, while maintaining state continuity across modes and minimizing the control (thrust) effort as provided below:

$x_i = [-3.5, -1, 0, 0, 0.5, 0, 0]^T$ $\delta_i = [0.5, 0.1, 0.05, 0, 0, 0, 0]^T$ $x_f = [0, 1, 0, 0, 10, 0, 0]^T$ $\delta_f = [2, 0.5, 0.15, \pi/2, 2, 2, 10]^T$ $x_{max} = -x_{min} = [10, 10, 10, 10, 10, 10, 10]^T$ $u_{max} = [10, 10, 5]^T \ u_{min} = [-10, -10, 0]^T$ $D = 1 \ R = I$ The trajectory provided by solving the above can provide the vehicle with a feasible nominal trajectory to follow. However, given model and environmental uncertainty, feedback for the trajectory tracking may be needed to ensure a successful medium transition (e.g., water-to-air transition). To design a feedback strategy, the mode schedule and a means for detecting the mode transitions (e.g., motor current sensor) can be utilized. A set of time-varying gains may be found to stabilize a trajectory. Further, according to some example embodiments, guards may be implemented for the controller in order to limit the trajectories to those that may be deemed desirable or attractive, which may also operate to ensure that the mode changes occur successfully. As such, the following relationships can be utilized:

$$\pi(\tau, x, q) = \begin{cases} \pi_\tau(\tau, x, q) & \tau \leq T(q) \\ \pi_T(\tau, x, q) & \tau > T(q) \end{cases}$$

where $$t = \begin{cases} 1 & \tau \leq T(q) \\ 0 & \tau > T(q) \end{cases}$$

and $\pi_\tau(\tau, x) = K_q(x - x_0(\tau, q)) + u_0(\tau, q).$ $K(\tau,q)$ may be found by integrating:

$-\dot{S} = A(\tau,q)^T S + S A(\tau,q) \ldots - S B(\tau,q) R(q)^{-1} B(\gamma,q)^T S + Q(q)$ backwards in time from $\tau = T(q)$ to $\tau = 0$. Here $$A(\tau, q) = \frac{\partial f(x_0(\tau, q), u(\tau, q))}{\partial x}, \text{ and}$$

$$B(\tau, q) = \frac{\partial f(x_0(\tau, q), u(\tau, q))}{\partial x},$$

and $K(\tau,q) = R(q)^{-1} B(\tau,q)^T S(\tau,q)$. As such, the reset map may be given as $\tau+ = 0$.

Accordingly, to compute $\pi_T(x,\tau,q)$, the reduced state space as follows may be considered:

$x_p = \{\phi, \theta, \psi, \delta_1, \delta_2, v_x, v_y, v_z, \omega_x, \omega_y, \omega_z\}$ The orientation and velocities given at the guard may be used by $x_0(T(q),q)$ to obtain a trim condition. The trim condition may then become the goal state for the time-invariant control. In this way, if due to modeling errors, the time-varying control does not successfully reach the conditions defined by the guard function, the time-invariant control may continue to drive the vehicle toward the mode transition state defined by the multi-domain trajectory.

Because the vehicle could be in $q_{T,i}$ for an undetermined amount of time, a Linear Quadratic Integral (LQI) compensator may be used. To do so, $x_p$ may be augmented with the error states $e = Cx = [e_\phi, e_\theta, e_\psi, e_{v_x}, e_{v_y}, e_{v_z}]$, where:

$$C = \begin{bmatrix} I & 0 \\ 0 & 0 \end{bmatrix}.$$

Accordingly, the result is $\dot{x}_a = A_a x_a + B_a u$, where:

$$A_a = \begin{bmatrix} A & 0 \\ C & 0 \end{bmatrix}, B_a = \begin{bmatrix} B \\ 0 \end{bmatrix}.$$

As such, the optimal Linear Quadratic Regulator (LQR) gains may then be determined for the augmented system. As such, the LQI controller may prevent errors in timing to prevent an early termination of the trajectory and carry the vehicle through to complete the medium transition. According to some example embodiments, rather than parameterizing the hybrid trajectory over time, the hybrid trajectory could be parameterized by state. In this regard, a transverse linearization may be used based on the state of the vehicle. For example, the transverse linearization may be based on the height of the vehicle from the surface of the medium transition, such as, the surface of the water as detected by the appropriate sensors.

Additionally, according to some example embodiments, partial states may be considered. In this regard, it may be the case that measurements for lateral and longitudinal positions of the vehicle below the water are not available, for example, due to the limited depth penetration of GPS signals and a lack of larger sensors such as a sonar array. Therefore, according to some example embodiments, at least for underwater motion, feedback may not be performed on $x_r$ and $y_r$ position estimates.

Further, according to some example embodiments, a state estimation approach may now be described. In this regard, the hybrid state estimator may include an extended Kalman filter for each mode, and additionally a mode estimator that determines the active filter for use under certain conditions. In this regard, a same or similar process model may be used for each estimator, and may be given as:

$$\dot{x} = \begin{bmatrix} I & 0 \\ 0 & 0 \end{bmatrix} + \begin{bmatrix} 0 \\ R_b^r(\theta) \end{bmatrix} a.$$

Here a represents the linear body accelerations measured by, for example, the IMU sensor. The orientation θ measured by the IMU sensor may also be modeled as an input.

For the measurement model, Table 1 below indicates, for example, which values (or sensor outputs) may be available in each mode given the environment.

TABLE 1

| Mode | $r_x$ | $r_y$ | $r_z$ | θ | v | ω | a |
|---|---|---|---|---|---|---|---|
| water | No | No | Yes | Yes | Yes | Yes | Yes |
| water-to-air | No | No | Yes | Yes | No | Yes | Yes |
| air | Yes | Yes | Yes | Yes | No | Yes | Yes |

It may also be assumed that mode detection sensors are utilized which are capable of detecting a zero crossing of each guard function $\Phi_1$ and $\Phi_2$. As such, the measurement models may be defined as:

$$y_{q0} = \begin{bmatrix} \rho_w g z_r \\ R_b^{rT} r \end{bmatrix} \quad y_{q1} = \begin{bmatrix} \rho_w g z_r \\ R_{b,33}^r z_r \end{bmatrix} \quad y_{q2} = \begin{bmatrix} z_r \\ y_r \\ R_{b,33}^{rT} z_r \end{bmatrix}$$

An assumption can be made that lateral and longitudinal GPS measurements are available in air flight or out of water modes and that the body velocity is measurable in the water. However, in mode $q_1$ (i.e., transitioning from water to air mode), there are no measurements of lateral or longitudinal velocity. As such, in the model, an assumption can be made that lateral motion is negligible and the velocity acts along $e_x$.

Accordingly, to select between modes, a standard deviation may be provided by the variance of the states to determine whether or not a mode transition is likely. This information may be integrated with data from the sensors to provide a more robust means for determining whether or not a mode transition has occurred.

Figure 6:
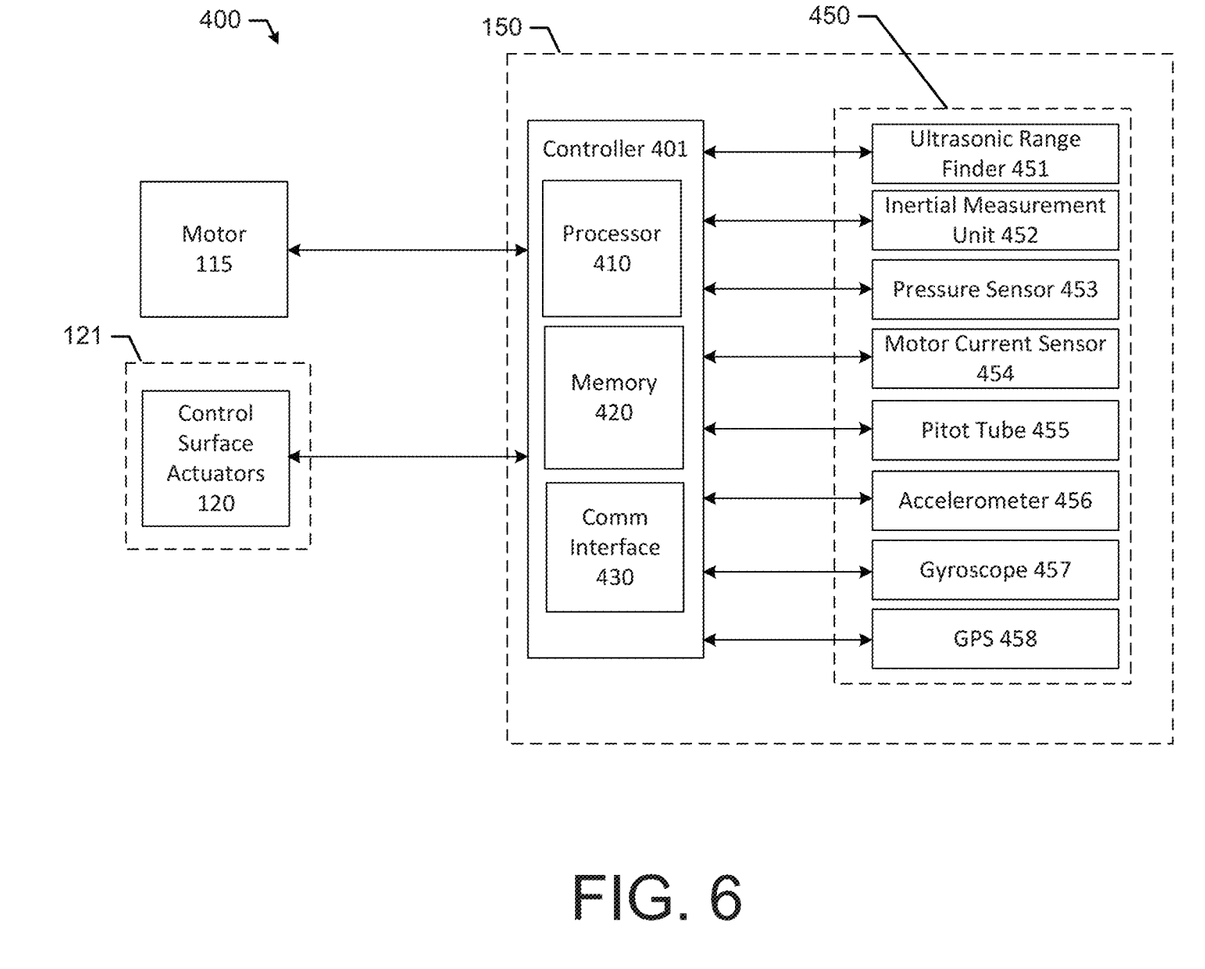
FIG. 6 illustrates a conceptual block diagram of some active components of a vehicle according to some example embodiments.

In light of the foregoing, FIG. 6 illustrates a conceptual block diagram 400 of some active components of the vehicle 100. In this regard, the vehicle 100, as stated above, may include the motor 115, control surface actuators 120, and the control circuitry 150. The control surface actuators 120 may be components of a maneuvering assembly 121 of the vehicle 100. As described above, the control circuitry 150 may be operably coupled to the motor 115 and the maneuvering assembly 121 to permit operational control of the motor 115 and the maneuvering assembly 121 by the control circuitry 150. The control circuitry 150, in particular, may have various architectures to perform the functionalities described herein. However, in accordance with some example embodiments, the control circuitry 150 may include a controller 401 and sensors 450. The controller 401 may comprise a processor 410 and a memory 420. According to some example embodiments, the controller 401 may further include a communications interface 430.

The processor 410 may be any type of processing device configured via either hardware or firmware to perform actions and functionalities described herein. In this regard, the processor 410 may be a microprocessor configured to read and execute instructions stored internal to the processor 410 or in the memory device 420. The memory device 420 may be any type of device for storing and accessing data for use by the processor 410. According to some example embodiments, the processor 410 may be programmable as a field programmable gate array (FPGA) or as an application specific integrated circuit (ASIC). The processor 410 may include inputs and outputs to interface with components external to the processor 410.

The communications interface 430 may be operably coupled to the processor 410 and be configured to provide a communications link to the vehicle 100 for, for example, remote control purposes or to relay acquired data measurements or the like. In this regard, the communications interface 430 may include or be operably coupled to an antenna to support wireless communications with the vehicle 100.

The controller 401 may be operably coupled to a number of sensors, also referred to as vehicle condition sensors 450. In this regard, the controller 401 may be configured to request measurement data from the sensors 450 and receive the measurements as inputs to the controller 401. The various sensors 405 may include an ultrasonic range finder 451, an inertial measurement unit (IMU) 452, a barometric pressure sensor 453, a motor current sensor 454, a pitot tube 455, an accelerometer 456 (e.g., three axis), a gyroscope 457, and/or a global positioning system sensor 458.

In this architecture, the control circuitry 150, the controller 401, and the processor 410 may be configured to perform various functionalities either via hardware or firmware/software configuration. In this regard, according to some example embodiments, the controller 401 may be configured to receive a command for the vehicle 100 to exit a first medium (e.g., water) and enter a second medium (e.g., air). The command may be received from an external source (e.g., a remote control) via the communications interface 430. Alternatively, according to some example embodiments, the command may be received from, possibly an internal, predefined schedule or high-level planner. Further, the command may be received while the vehicle 100 is completely disposed within the first medium. The controller 401 may be further configured to compute or retrieve a hybrid trajectory for transitioning the vehicle 100 from the first medium to the second medium. In this regard, the hybrid trajectory may be computed based upon a physics model of the vehicle 100 as described above. However, according to some example embodiments, the hybrid trajectory for transitioning the vehicle 100 from the first medium to the second medium may be predetermined or precalculated and stored in, for example, the memory 420. As such, in response to receiving the command, the controller 401 may be configured to retrieve the hybrid trajectory from, for example, the memory 420 and, according to some example embodiments, from a table or library stored in the memory 420 that indicates trajectory and other operating parameters (e.g., engine speeds or changes in engine speeds) for a given mode. In this regard, as described above, the state of the vehicle 100 may be used to identify the hybrid trajectory in the trajectory library 540 to be provided to the linear model predictive control 550 with the state information to control the motor 115 and the maneuvering assembly 121 to perform the medium transition operation.

Further, the controller 401 may be configured to control maneuvering of the vehicle 100, for example, by controlling the maneuvering assembly 121 and possibly the control surface actuators 120 of the maneuvering assembly 121, in accordance with the hybrid trajectory. Additionally, the controller 401 may be configured to track a state of the vehicle 100. In this regard, the state of the vehicle 100 may be tracked by monitoring the outputs of some or all of the sensors 450 including the motor current sensor 454. The controller 401 may receive motor current measurements from the motor current sensor 454 to determine at least a current mode of the vehicle 100, where the current mode of the vehicle 100 is one parameter of the state. The controller 401 may be further configured to detect the current mode to be a medium transitional mode (e.g., a mode transitioning from one medium to another) by detecting a change in RPM of the electric motor 115 that exceeds a threshold value (e.g., an RPM threshold value), or by detecting a change in the electric current or voltage to the electric motor 115 that exceeds a threshold value (e.g., an electric current threshold value or an electric voltage threshold value). Further, the controller 401 may be further configured to receive information indicative of, or estimate other parameters of, the state of the vehicle 100, such as, one or more of the mode, an attitude, an altitude, and a speed of the vehicle 100. In this regard, the controller 401 may be configured to receive various information from the sensors 450 to determine the attitude, altitude, and speed of the vehicle 100. For example, to determine the attitude of the vehicle 100, the controller 401 may receive measurements and information from the accelerometer 456 or the gyroscope 457. Additionally, to determine the altitude of the vehicle 100 or a distance to a water's surface, the controller 401 may receive information from, for example, the ultrasonic range sensor 451 or other range sensor if the vehicle 100 is in air flight, or receive information from, for example, the barometric pressure sensor 453 if the vehicle 100 is submerged to determine altitude under the water or depth. According to some example embodiments, the IMU 452 may also be leveraged, possibly in conjunction with the range finder, to determine the height of the vehicle 100 above the water. To determine a speed of the vehicle 100, the controller 401 may retrieve current measurements from the motor current sensor 454 to determine the propeller RPM, then use the propeller RPM with the current mode to determine the speed of the vehicle 100.

Accordingly, the controller 401 may be configured to track or monitor the state of the vehicle 100, where the state indicates that the vehicle 100 is in a medium transitional mode (e.g., as indicated by a detected change in motor current or RPMs). According to some example embodiments, the controller 401 may be configured to compute a set of time-varying gains or gains schedules to enable the vehicle to follow the hybrid trajectory in the presence of disturbances. In this regard, the controller 401 may be configured to, in response to ongoing tracking of the state as feedback, make maneuvering adjustments to maintain compliance with the hybrid trajectory. In this regard, the controller 401 may be configured to make adjustments with respect to the maneuvering assembly 121 to maintain compliance with the hybrid trajectory. According to some example embodiments, the adjustments may be made to maintain a trajectory that matches the hybrid trajectory with a given threshold deviation. According to some example embodiments, the controller 401 may be further configured to control the electric motor 115 and the maneuvering assembly 121 to make such adjustments. In this regard, the linear model predictive control 550 implemented by the controller 401 may be utilized, possibly in an iterative fashion, to control the electric motor 115 and the maneuvering assembly 121 and provide stability with respect to the hybrid trajectory via closed-loop feedback of the state of the vehicle 100.

Further, the controller 401 may be configured to continue to track the state of the vehicle 100, as described above. Based on the state of the vehicle 100 indicating that entry into the second medium has been completed and the vehicle 100 is now in a non-transitional mode (e.g., air or flight mode, water or submerged mode, or the like), the controller 401 may be configured to make maneuvering adjustments for operation in the second medium.

Figure 7:
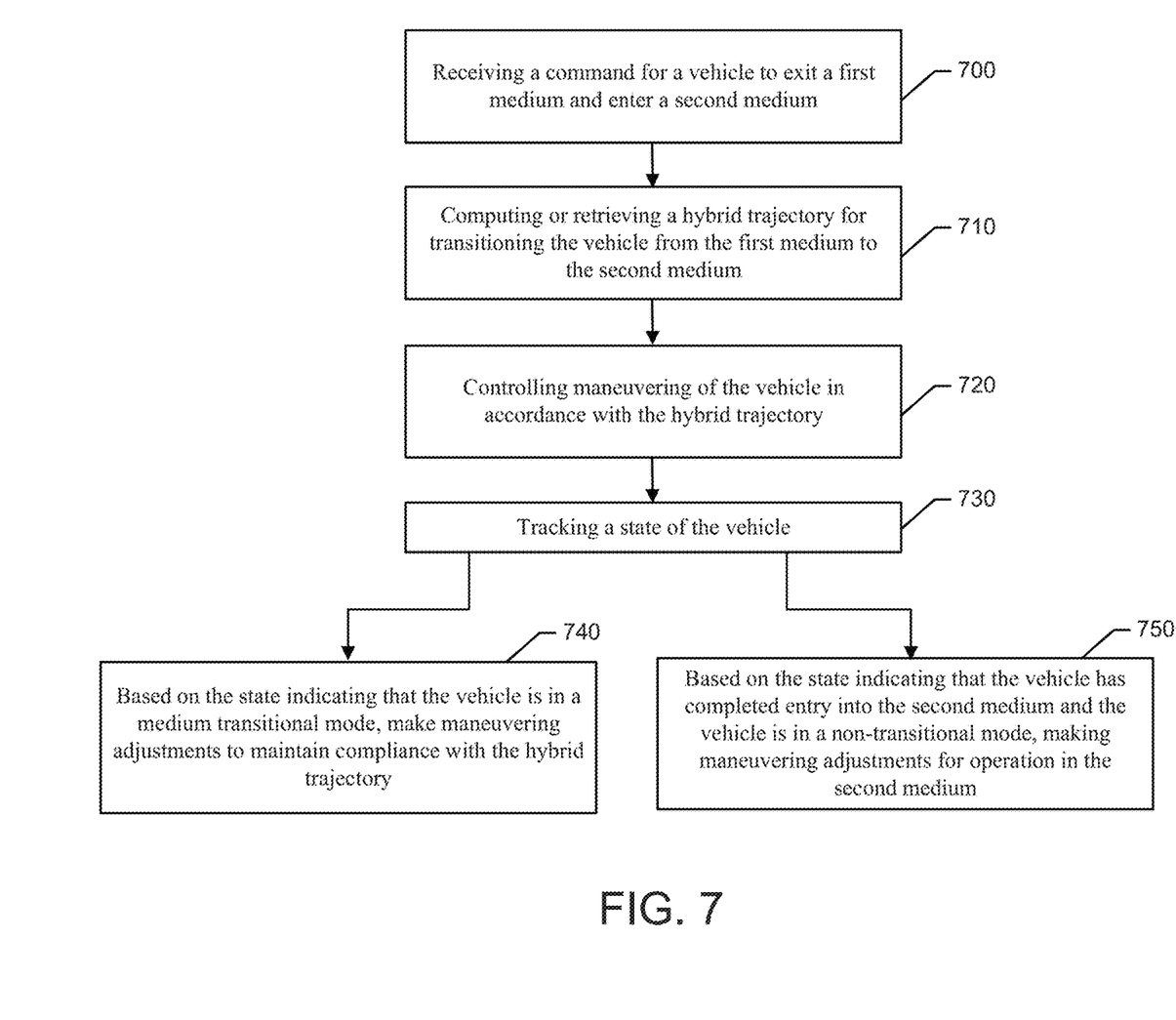
FIG. 7 illustrates a flowchart of an example method according to an example embodiment.

According to some example embodiments, an example method may be provided for controlling the movement of an aerial-aquatic vehicle as shown in FIG. 7. The example method may be implemented by various hardware of the vehicle including for example, the controller 401. In this regard, the example method may include, at 700, receiving a command for a vehicle to exit a first medium and enter a second medium. Further, at 710, the example method may include computing or retrieving a hybrid trajectory for transitioning the vehicle from the first medium to the second medium. At 720, the example method may further include controlling maneuvering of the vehicle in accordance with the hybrid trajectory. Further, at 730, the example method may include tracking a state of the vehicle. Based on the state indicating that the vehicle is in a medium transitional mode, the example method may include making maneuvering adjustments to maintain compliance with the hybrid trajectory at 740. Alternatively, at 750, the example method may include, based on the state indicating that the vehicle has completed entry into the second medium and the vehicle is in a non-transitional mode, making maneuvering adjustments for operation in the second medium.

According to some example embodiments, the example method may further comprise inputting the current state of the vehicle into a linear model predictive control to adjust the current trajectory. According to some example embodiments, the example method may further comprise determining the medium transition trajectory from a trajectory library based on the current state of the vehicle. Further, according to some example embodiments, the example method may include detecting the mode to be a medium transitional mode by detecting a change in revolutions per minute of the electric motor that exceeds a threshold value. Still, according to some example embodiments, the example method may further comprise detecting the mode to be a medium transitional mode by detecting a change in the electric current or voltage to the electric motor that exceeds a threshold value. According to some example embodiments, the example method may further comprise generating the recurring estimation of the current state based on one or more vehicle condition sensor inputs to the controller. In this regard, the example method may include generating the recurring estimation based on an input from a range sensor configured to indicate a distance to a medium transition or generating the recurring estimation based on an input from a pressure sensor indicating an environmental pressure of the vehicle.

Many modifications and other embodiments set forth herein will come to mind to one skilled in the art to which these inventions pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle for aerial-aquatic locomotion, the vehicle comprising:
   a propeller;
   an electric motor operably coupled to the propeller and configured to rotate the propeller;
   a maneuvering assembly configured to change an attitude and altitude of the vehicle; and
   a controller operably coupled to the electric motor and the maneuvering assembly, the controller being configured to:
      receive a command for the vehicle to exit a first medium and enter a second medium;
      compute or retrieve a hybrid trajectory for transitioning the vehicle from the first medium to the second medium;
      control the electric motor and the maneuvering assembly to maneuver the vehicle in accordance with the hybrid trajectory; and
      track a state of the vehicle and, based on the state indicating that the vehicle is in a medium transitional mode, make maneuvering adjustments to maintain compliance with the hybrid trajectory; or based on the state indicating that the vehicle has completed entry into the second medium and the vehicle is in a non-transitional mode, make maneuvering adjustments for operation in the second medium,
      wherein the state of the vehicle includes one or more of a mode, an altitude, an attitude, and a speed of the vehicle.

2. The vehicle of claim 1, wherein the controller is further configured to input the state into a linear model predictive control to determine the maneuvering adjustments.

3. The vehicle of claim 2, wherein the controller is further configured to retrieve the hybrid trajectory from a trajectory library based on the state of the vehicle.

4. The vehicle of claim 1, wherein the controller is further configured to detect the mode to be a medium transitional mode by detecting a change in revolutions per minute of the electric motor that exceeds a threshold value.

5. The vehicle of claim 1, wherein the controller is further configured to detect the mode to be a medium transitional mode by detecting a change in the electric current or voltage to the electric motor that exceeds a threshold value.

6. The vehicle of claim 1, wherein the controller is configured to track the state of the vehicle based on one or more vehicle condition sensor inputs to the controller.

7. The vehicle of claim 6, further comprising a range sensor configured to indicate a distance to a medium transition and operably coupled to the controller to provide one of the vehicle condition sensor inputs.

8. The vehicle of claim 6, further comprising a pressure sensor operably coupled to the controller to provide one of the vehicle condition sensor inputs.

9. A method for controlling the movement of an aerial-aquatic vehicle, the method comprising:
   receiving a command, at a controller, for the vehicle to exit a first medium and enter a second medium;
   computing or retrieving a hybrid trajectory for transitioning the vehicle from the first medium to the second medium;
   controlling an electric motor and a maneuvering assembly of the vehicle to maneuver the vehicle in accordance with the hybrid trajectory; and
   tracking a state of the vehicle and, based on the state indicating that the vehicle is in a medium transitional mode, making maneuvering adjustments to maintain compliance with the hybrid trajectory; or based on the state indicating that the vehicle has completed entry into the second medium and the vehicle is in a non-transitional mode, making maneuvering adjustments for operation in the second medium,
   wherein the state of the vehicle includes one or more of a mode, an altitude, an attitude, and a speed of the vehicle.

10. The method of claim 9, wherein making maneuvering adjustments further comprises inputting the state of the vehicle into a linear model predictive control to determine the maneuvering adjustments.

11. The method of claim 10, further comprising retrieving the hybrid trajectory from a trajectory library based on the state of the vehicle.

12. The method of claim 9, further comprising detecting the mode to be a medium transitional mode by detecting a change in revolutions per minute of the electric motor that exceeds a threshold value.

13. The method of claim 9, further comprising detecting the mode to be a medium transitional mode by detecting a change in the electric current or voltage to the electric motor that exceeds a threshold value.

14. The method of claim 9, further comprising tracking the state of the vehicle based on one or more vehicle condition sensor inputs to the controller.

15. The method of claim 14, further comprising tracking the state of the vehicle based on an input from a range sensor configured to indicate a distance to a medium transition.

16. The method of claim 14, further comprising tracking the state of the vehicle based on an input from a pressure sensor indicating an environmental pressure of the vehicle.

17. A control system for a vehicle capable of travelling through medium transitions, the control system comprising a controller and a plurality of sensors providing inputs to the controller, the controller being configured to:
   receive a command for the vehicle to exit a first medium and enter a second medium;
   compute or retrieve a hybrid trajectory for transitioning the vehicle from the first medium to the second medium;
   control the electric motor and a maneuvering assembly operably coupled to the controller to maneuver the vehicle in accordance with the hybrid trajectory; and
   track a state of the vehicle, wherein the state of the vehicle includes one or more of a mode, an altitude, an attitude, and a speed of the vehicle.

18. The control system of claim 17, wherein the controller is further configured to input the state of the vehicle into a linear model predictive control to iteratively determine the maneuvering adjustments.

19. The control system of claim 18, wherein the controller is further configured to retrieve the hybrid trajectory from a trajectory library based on the state of the vehicle.

20. The control system of claim 17, wherein based on the state indicating that the vehicle is in a medium transitional mode, the controller makes maneuvering adjustments to maintain compliance with the hybrid trajectory; or based on the state indicating that the vehicle has completed entry into the second medium and the vehicle is in a non-transitional mode, the controller makes maneuvering adjustments for operation in the second medium.

* * * * *